United States Patent [19]

Ogden

[11] 4,299,925
[45] Nov. 10, 1981

[54] RESIN FOAMS

[75] Inventor: Dennis H. Ogden, Wolverhampton, England

[73] Assignee: British Industrial Plastics Limited, Manchester, England

[21] Appl. No.: 841,587

[22] Filed: Oct. 11, 1977

[51] Int. Cl.³ .......................................... C08G 12/12
[52] U.S. Cl. ..................................... 521/188; 521/917
[58] Field of Search ...................... 260/2.5 F; 521/188

[56] References Cited

U.S. PATENT DOCUMENTS

| | | | |
|---|---|---|---|
| 2,807,595 | 9/1957 | Brown | 260/2.5 F |
| 2,813,780 | 11/1957 | Vieli | 260/2.5 F |
| 3,006,871 | 10/1961 | Sunderland | 260/2.5 F |
| 3,063,952 | 11/1962 | Vieli | 260/2.5 F |
| 3,150,108 | 9/1964 | Vieli | 260/2.5 F |
| 3,256,067 | 6/1966 | Shriver et al. | 260/2.5 F |
| 3,284,379 | 11/1966 | Brosco et al. | 260/2.5 F |
| 3,306,861 | 2/1967 | Justice | 260/2.5 F |
| 3,377,139 | 4/1968 | MacGregor et al. | 260/2.5 F |
| 3,457,199 | 7/1969 | Wells et al. | 260/2.5 F |
| 3,535,273 | 10/1970 | Bauer | 260/2.5 F |
| 3,554,936 | 1/1971 | Broude et al. | 260/2.5 F |
| 3,631,134 | 12/1971 | Scheuermann et al. | 260/2.5 F |
| 3,661,812 | 5/1972 | Buchner et al. | 260/2.5 F |
| 3,740,355 | 6/1973 | Klug | 260/2.5 F |
| 4,069,175 | 1/1978 | Moore | 260/2.5 F |

Primary Examiner—Morton Foelak
Attorney, Agent, or Firm—Cushman, Darby & Cushman

[57] ABSTRACT

Here is described the manufacture of a cured urea/formaldehyde resin foam having a shrinkage on drying of less than 20% by volume, by a method which includes the step of producing a homogeneous wet foam from an aqueous resin solution and an aqueous solution of a hardener for the resin, the freshly made wet foam having a total reactive resin solids content of at least 35% by weight. Apparatus for producing the cured resin foam includes a foaming column having upstream and downstream regions constituted by different inert materials.

5 Claims, 1 Drawing Figure

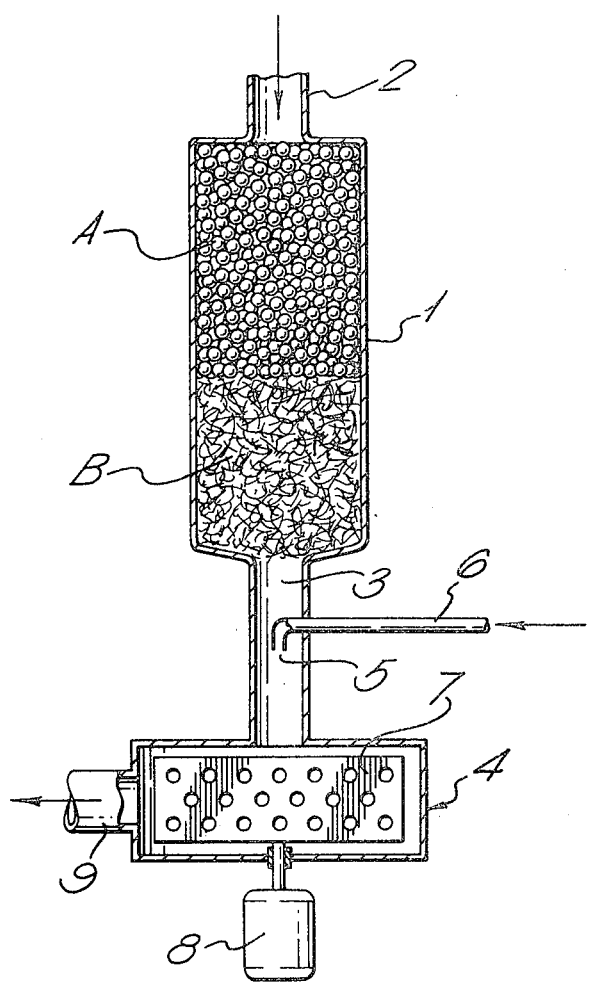

RESIN FOAMS

The present invention relates to the production of low density self-sustaining foams of cured urea/formaldehyde resin material. Such foams can be used, for example, in the building industry for thermal insulation purposes.

Low density in the present context means a dry density of less than 20 kg/m$^3$ in the absence of any inert filler, corresponding to a resin solids content of less than 20 kg/m$^3$. Such foams are made by forming a wet foam containing an intimate mixture of a resin and a hardener for the resin, both being initially in aqueous solution. The wet foam can be injected, for example, into a cavity wall and allowed to cure/dry in situ. Conventional low-density urea/formaldehyde resin foams exhibit a considerable degree of shrinkage on drying and it is an object of the present invention to provide a method and apparatus for producing a cured urea/formaldehyde resin foam which exhibits a relatively low shrinkage on drying. In this Specification, low shrinkage means less than 20% by volume, based on a comparison between air dry volume and the original wet volume as delivered by the foam generating apparatus.

According to the present invention a cured urea/formaldehyde resin foam having a shrinkage on drying of less than 20% by volume is made by a method including the step of producing a homogeneous wet foam from an aqueous resin solution and an aqueous solution of a hardener for the resin, so that the freshly made wet foam has a total reactive resin solids content of at least 35% by weight.

It has been found that by employing a solids content of at least 35% by weight and hence a water content of no more than 65% in the wet foam, the shrinkage on drying is significantly reduced over that of conventional foams where water contents of 70% and more are typical. Conventional foams are produced by methods which include a preliminary step of appreciably diluting the viscous, neat resin solution, typically on at least a 1:1 volume basis with water; this has hitherto been thought essential to ensure proper mixing afterwards with the foamed hardener solution. In practice, mixing with the hardener solution effects a further dilution; ratios of resin to hardener solution in the range of 1:1 to 3:2 by volume are generally used to obtain the desired final, dry density of less than 20 kg/m$^3$. The product is a wet foam containing only 20 or at most 30% solids.

For the purposes of the present invention, the wet foam is preferably made by producing a very low density foam from an aqueous solution of a hardener for the resin and thereafter intimately mixing a relatively undiluted resin solution with this foam. "Very low density" in this context means low in relation to the hardener foam density which would normally be used to make a dry foam of the desired density of less than 20 kg/m$^3$ by the prior art method from the usual, relatively dilute resin solutions, further diluted by the hardener solution.

The lower the density of the hardener foam, the more concentrated the resin solution mixed with it may be, subject to the final, dry foam meeting the density criterion or less than 20 kg/m$^3$, in the absence of any inert filler.

Whilst it is normally more convenient to foam the hardener solution, the invention also includes the converse route, wherein a very low density foam of resin solution is mixed with an unfoamed hardener solution. "Very low density" has the same meaning as given above in relation to the hardener foam. For practical purposes, however, it is normally easier to foam the hardener solution—which usually contains a surfactant—than the resin solution which is viscous, especially when relatively undiluted. Because the resin is viscous, considerable difficulty may be experienced in mixing it with the foamed hardener solution to obtain a homogeneous wet foam. In order to obviate this difficulty, care is necessary in the design of the mixing apparatus and it may be necessary to use a mechanical mixing device such as a power driven impeller downstream of the mixing zone. The method of the invention therefore preferably includes the step of subjecting an initial mixture of a foam and a solution to mechanical agitation so as to form a homogeneous wet foam in which the resin and hardener are intimately mixed.

The desired very low density of the hardener, or resin, foam may be achieved by passing the solution through a longer-than-normal foaming column packed with beads, or the throughput of a conventional-sized column may be reduced to give a foam of lower-than-normal density. It will be appreciated that "longer-than-normal" in the present context refers to the type of foaming column used for conventional foam production. Many different sizes and configurations of column can be used in conventional foam production, the optimum performance of any given column being arrived at by experiment and/or experience. The surfactant content of the solution may also be altered. Many permutations of column and surfactant content are possible. However, it has been found that the maximum effect in terms of throughput and very low foam density compared with conventional foam production is achieved for a given, normal column size by replacing the beads by an inert reticulated structure, such as woven or knitted fabric, for example, of stainless steel wire.

Such reticulated structures can present problems in that during the start-up of the foam generating process, there may be a considerable initial throughput of unfoamed or partly-foamed liquid. This carry-over of some unfoamed liquid may indeed continue throughout the foaming operation.

According to a further aspect of the present invention, apparatus for producing a cured urea/formaldehyde resin foam having a shrinkage on drying of less than 20% by volume includes a foaming column provided with an upstream region constituted by inert particulate material and a downstream region constituted by an inert reticulated structure.

It will be understood that "upstream" and "downstream" refer to the direction of flow of the solution to be foamed in the column. A particularly preferred inert reticulated structure is a knitted stainless steel wire fabric, for example of the kind sold under the Registered Trade Mark KNITMESH. The inert particulate material may be glass beads.

The relative sizes of the two regions can be varied over a considerable range for any given column size, but in practice regions of roughly equal size (i.e. length) have been found satisfactory.

Preferably, the apparatus further includes mechanical mixing means downstream of the foaming column.

The invention also includes cured urea/formaldehyde resin foams having a shrinkage on drying of less than 20% by volume, when made by a method, or by means of an apparatus, according to the invention. Such foams are useful in particular for cavity wall insulation because they exhibit a significantly lower degree of shrinkage on drying than do conventional foams. They therefore shrink away from the walls of the cavity to an appreciably lesser extent than do conventional foams. Also, because of their reduced water content they can be used as loft insulation with a considerably reduced risk of water penetration through a ceiling of plaster or plasterboard. Hitherto, the risk of water penetration and consequent staining of ceilings has discouraged the use of urea/formaldehyde resin foams as loft insulation material.

In order that the method of the invention be better understood, a preferred embodiment of it will now be described by way of example with reference to the accompanying diagrammatic drawing in which the sole FIGURE is a cross-sectional side view through a foam generating apparatus in accordance with the invention.

In the FIGURE a tubular column 1 has an inlet 2 and an outlet 3. Between the inlet and the outlet are two regions A and B, containing, respectively, glass beads of the average diameter 6 mm. and a mass of knitted stainless steel wire fabric. In this example, the regions are both 180 mm. long, whilst the column diameter is 45 mm. The outlet 3 is connected by a short tube to a mechanical mixer 4, a resin solution feed nozzle 5 being provided in the short tube so as to enable resin to be forced into the tube from a supply pipe 6. The nozzle 5 is disposed so as to direct the resin stream towards the mixer 4, which consists of a generally cylindrical chamber of diameter 65 mm. and containing a rotatable, perforated impeller 7. An air motor 8 is provided to drive the impeller from outside the chamber. An outlet pipe 9 leads tangentially out of the chamber and constitutes a tailpipe for supplying wet foam to wherever it is required.

EXAMPLE

In a specific operation, hardener solution containing 1.4% by weight of a surfactant was supplied to the inlet 2 at a rate of 2 liters/minute. The inlet 2 was also supplied with air at 40 KN/m$^2$ and at the outlet 3 a very low density foam resulted. This "very low density" was assessed by comparison with the conventional foam production run described below. An aqueous resin solution containing 76 wt.% reactive resin solids was supplied via pipe 6 at a rate of 2½ liters/minute and mixed with the foam in the short tube and mixer 4, the impeller being rotated at 900 r.p.m. The resin was in this case "BEETLE" BU700 and the hardener was "BEETLE" FH100, an acidic solution containing an anionic surfactant. "BEETLE" is a Registered Trade Mark of British Industrial Plastics Limited.

The resultant homogeneous wet foam leaving the tailpipe 9 had a total reactive resin solids content of 47% and a water content of 53%. On curing/drying, it had a shrinkage of less than 15% by volume and a final dry density of 14 kg/m$^3$.

COMPARATIVE EXAMPLE

By contrast, a conventional foam was made using a column packed only with 6 mm. glass beads; the mixer 4, was not necessary to produce a homogeneous foam. The resin solution was supplied at 3 liters/minute and contained 27% total reactive resin solids. The hardener solution was the same as above and the same flow rate was used. However, the density of the hardener foam produced was much greater than that produced in the Example just given. The homogeneous wet foam leaving the tail pipe contained 20% resin solids and 80% water. The final dry density of the cured/dried foam was 14 kg/m$^3$ but on drying, it shrank by over 24% by volume.

In both cases, curing/drying took place under similar ambient conditions of temperature and relative humidity.

What we claim is:

1. A process for the production from a urea-formaldehyde resin of a cured foam of dry density not more than about 20 kg/m$^3$, comprising
   (a) forming a first foam from an aqueous surfactant-containing solution of a hardener for said resin;
   (b) introducing said first foam and a viscous aqueous solution of said resin into a mixing zone to form a mixture thereof;
   (c) subjecting the thus-produced mixture, downstream of said mixing zone, to mechanical agitation to form a homogeneous wet second foam;
the reactive resin solids content of the viscous aqueous solution set forth in (b) being selected so as to yield said homogeneous wet second foam in a form having a total reactive resin solids content of at least 35% by weight, whereby the cured foam produced on curing of said second foam exhibits a shrinkage on drying of less than 20% by volume.

2. A method according to claim 1, wherein said first foam is made by passing the solution through a foaming column packed with spherical beads.

3. A method according to claim 1, wherein said first foam is made by passing the solution through a conventional foaming column, the throughput of said column being reduced to give a foam of lower than normal density.

4. A method according to claim 1, wherein said first foam is made by passing the solution through a foaming column packed with an inert reticulated structure.

5. A method according to claim 1, wherein said first foam is made by passing the solution through a foaming column having an upstream region constituted by inert particulate material and a downstream region constituted by an inert reticulated structure.

* * * * *